(12) United States Patent
Shimo et al.

(10) Patent No.: US 6,844,067 B2
(45) Date of Patent: Jan. 18, 2005

(54) BLACK IRON-BASED PARTICLES AND BLACK TONER CONTAINING THE SAME

(75) Inventors: Nobuya Shimo, Hiroshima-ken (JP); Koso Aoki, Hiroshima-ken (JP); Hiromitsu Sakurai, Hiroshima-ken (JP); Shinji Uemoto, Hiroshima-ken (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/686,776

(22) Filed: Oct. 17, 2003

(65) Prior Publication Data

US 2004/0131852 A1 Jul. 8, 2004

(30) Foreign Application Priority Data

Oct. 24, 2002 (JP) .................................... 2002-310210

(51) Int. Cl.⁷ ................................................ B32B 5/16
(52) U.S. Cl. ..................... 428/402; 428/403; 428/702
(58) Field of Search ................................ 428/402, 403, 428/702

(56) References Cited

U.S. PATENT DOCUMENTS

| | | | | |
|---|---|---|---|---|
| 5,652,060 A | * | 7/1997 | Uchida et al. | 428/404 |
| 5,873,610 A | * | 2/1999 | Szabo | 285/319 |
| 6,130,017 A | * | 10/2000 | Hayashi et al. | 430/108.3 |
| 6,383,637 B1 | * | 5/2002 | Misawa et al. | 428/403 |
| 6,780,555 B2 | * | 8/2004 | Uchida et al. | 430/106.2 |

* cited by examiner

*Primary Examiner*—H. Thi Le
(74) *Attorney, Agent, or Firm*—Nixon & Vanderhye P.C.

(57) ABSTRACT

Black iron-based particles comprise a $FeTiO_3$—$Fe_2O_3$ solid solution or a mixed composition of a $FeTiO_3$—$Fe_2O_3$ solid solution and an iron-based oxide having a spinel structure, and having a Ti content of from more than 10.0 atm % to 40.0 atm %, calculated as Ti, based on whole Fe, and a blackness ($L^*$ value) of 6 to 13.

17 Claims, 4 Drawing Sheets

200nm

200nm

BLACK IRON-BASED PARTICLES AND BLACK TONER CONTAINING THE SAME

BACKGROUND OF THE INVENTION

The present invention relates to black iron-based particles and a black toner containing the black iron-based particles, and more particularly, to black iron-based particles having not only an excellent blackness but also a less magnetization value, and a black toner containing the black iron-based particles, which has not only an excellent blackness but also a low magnetization value.

The black iron-based particles of the present invention are used as black-colored pigments and paints, colorants for resin compositions, etc., and, in particular, are applicable to black non-magnetic toners.

Hitherto, black pigments such as magnetite particles, ilmenite particles and carbon black have been generally used as colorants for paints, printing inks, cosmetics, rubbers, resin compositions or the like.

In particular, composite particles prepared by mixing-dispersing black magnetic iron oxide particles such as magnetite particles in resins have been more frequently used for a magnetic toner as an electrophotographic developer.

With recent tendency to high-speed copying operation and high-image quality for laser beam printers or digital copying machines, it has been strongly required to improve properties of a black toner used as a developer. In particular, the black toner has been strongly required to have a sufficient blackness.

Separately, in recent years, with the progress of full color printing and copying techniques, non-magnetic toners have been used in the fields of printers or copying machines.

Thus, in the field of such black toners, it has also been demanded to provide black non-magnetic toners having non-magnetic properties or a much less magnetization value which are suitably applicable to the current developing systems.

Although, as described above, it has been strongly required to improve various properties of the black toners, it is known that the black toners, especially black pigments contained therein, have significant influences on developing characteristics. That is, since the properties of the black toners have a close relationship with those of the black pigments mixed and dispersed therein, it has also been strongly required to further improve properties of the black pigments used in the black toners.

Namely, in order to obtain black toners exhibiting an excellent blackness, black particles used therein have been required to show a sufficient blackness and an excellent dispersibility. Also, in order to suitably apply the black toners to the current developing systems using non-magnetic toners, the black particles used therein have also been required to be particles having non-magnetic properties or a much less magnetization value.

It is known that since carbon black as non-magnetic particles is in the form of fine particles having an average particle diameter of about 0.005 to 0.05 $\mu$m, it may be difficult to disperse the carbon black in vehicle or resin compositions. In addition, it is also known that since the carbon black is in the form of bulky particles having a bulk density of about 0.1 g/cm$^3$, the carbon black is poor in handling property and workability.

Thus, it has been required to provide black particles having an excellent blackness and a low magnetization value. The low magnetization value (saturation magnetization value) used herein means that the magnetization value (saturation magnetization value) is minimized so as to be applicable to the current developing systems, more specifically, is usually not more than 60 Am$^2$/kg, preferably not more than 40 Am$^2$/kg.

As the black-colored iron-based particles, there are known ilmenite particles obtained by hydrothermal treatment (Japanese Patent Application Laid-Open (KOKAI) No. 1-298028(1989)); black pigment particles having a mixed composition composed of $Fe_2TiO_5$ and $Fe_2O_3$—$FeTiO_3$ solid solution (Japanese Patent Application Laid-Open (KOKAI) No. 3-2276(1991)); black magnetic iron oxide particles having a magnetization value $\sigma_{1000}$ (at a magnetic field of 1 kOe) of 20 to 50 Am$^2$/kg, and containing titanium in an amount of 0.5 to 10.0 atm % based on whole Fe (Japanese Patent Application Laid-Open (KOKAI) No. 8-34617(1996)); and titanium-containing magnetite particles (Japanese Patent Application Laid-Open (KOKAI) No. 2002-196528).

Although, at present, it has been strongly required to provide black iron-based particles having an excellent blackness and a less magnetization value, such particles have not been obtained conventionally.

That is, in Japanese Patent Application Laid-Open (KOKAI) No. 1-298028(1989), it is described that the ilmenite particles are produced by hydrothermal treatment using $Ti^{3+}$. However, the production of the ilmenite particles by hydrothermal treatment is disadvantageous from industrial viewpoints.

Although the non-magnetic particles described in Japanese Patent Application Laid-Open (KOKAI) No. 3-2276 (1991) contain $Fe_2TiO_5$ and, therefore, have a low magnetization value, such particles have a low tinting strength and, therefore, fail to show a sufficient blackness, as shown in the below-mentioned Comparative Examples.

The black magnetic iron oxide particles described in Japanese Patent Application Laid-Open (KOKAI) No. 8-34617(1996) have a Ti content of 0.5 to 10 atm % and a magnetization value $\sigma_{1000}$ at a magnetic field of 1 kOe as high as 20 to 50 emu/g and, therefore, fail to sufficiently apply to the current non-magnetic developing systems.

In Japanese Patent Application Laid-Open (KOKAI) No. 2002-196528, there is described that the black toner containing a metal oxide has a magnetization value of not more than 40 emu/g. However, since Ti-containing magnetite particles having a large average particle diameter were used as the metal oxide in Examples, the obtained black toner fails to show a satisfactory tinting strength.

As a result of the present inventors' earnest studies, it has been found the following matters. Upon production of the black iron-based particles, it is important to add a titanium compound to a water suspension of magnetite particles for coating the surface of the magnetite particles with the titanium compound (titanium oxide hydroxide). In order to form the coat of the titanium oxide hydroxide, it is necessary to allow the water suspension to maintain its pH value without lowering thereof, obtained immediately after adding the titanium compound thereto. When the magnetite particles coated with the titanium oxide hydroxide are heat-calcined at a specific temperature under a non-oxidative atmosphere, and then pulverized, the obtained particles can unexpectedly show not only an excellent blackness but also a low magnetization value. The present invention has been attained on the basis of the above findings.

SUMMARY OF THE INVENTION

An object of the present invention is to provide black iron-based particles having not only an excellent blackness but also a less magnetization value.

Another object of the present invention is to provide a black toner having not only an excellent blackness but also a less magnetization value.

To accomplish the aims, in the first aspect of the present invention, there are provided black iron-based particles comprising a $FeTiO_3$—$Fe_2O_3$ solid solution or a mixed composition of a $FeTiO_3$—$Fe_2O_3$ solid solution and an iron-based oxide having a spinel structure, and having a Ti content of from more than 10.0 atm % to 40.0 atm %, calculated as Ti, based on whole Fe, and a blackness (L* value) of 6 to 13.

In the second aspect of the present invention, there are provided black iron-based particles comprising (1) a $FeTiO_3$—$Fe_2O_3$ solid solution or a mixed composition of a $FeTiO_3$—$Fe_2O_3$ solid solution and an iron-based oxide having a spinel structure, and (2) a Na—Fe—Ti compound, and having a Ti content of from more than 10.0 atm % to 40.0 atm %, calculated as Ti, based on whole Fe, and a blackness (L* value) of 6 to 13.

In the third aspect of the present invention, there are provided black iron-based particles comprising (1) a $FeTiO_3$—$Fe_2O_3$ solid solution or a mixed composition of a $FeTiO_3$—$Fe_2O_3$ solid solution and an iron-based oxide having a spinel structure, and (2) a blue pigment, and having a Ti content of from more than 10.0 atm % to 40.0 atm %, calculated as Ti, based on whole Fe, and a blackness (L* value) of 6 to 13.

In the fourth aspect of the present invention, there are provided black iron-based particles comprising (1) a $FeTiO_3$—$Fe_2O_3$ solid solution or a mixed composition of a $FeTiO_3$—$Fe_2O_3$ solid solution and an iron-based oxide having a spinel structure, (2) a Na—Fe—Ti compound, and (3) a blue pigment, and having a Ti content of from more than 10.0 atm % to 40.0 atm %, calculated as Ti, based on whole Fe, and a blackness (L* value) of 6 to 13.

In the fifth aspect of the present invention, there are provided black iron-based particles a $FeTiO_3$—$Fe_2O_3$ solid solution or a mixed composition of a $FeTiO_3$—$Fe_2O_3$ solid solution and an iron-based oxide having a spinel structure, and having a Ti content of from more than 10.0 atm % to 40.0 atm %, calculated as Ti, based on whole Fe, a blackness (L* value) of 6 to 13, a saturation magnetization value of 5 to 40 $Am^2/kg$ and an average particle diameter of 0.04 to 0.24 μm.

In the seventh aspect of the present invention, there are provided black iron-based particles comprising:

(1) a $FeTiO_3$—$Fe_2O_3$ solid solution or a mixed composition of a $FeTiO_3$—$Fe_2O_3$ solid solution and an iron-based oxide having a spinel structure, and (2) a Na—Fe—Ti compound, and having a Ti content of from more than 10.0 atm % to 40.0 atm %, calculated as Ti, based on whole Fe, a saturation magnetization value of 0.1 to 60 $Am^2/kg$, a blackness (L* value) of 6 to 13 and an average particle diameter of 0.04 to 0.24 μm, said Na—Fe—Ti compound being contained in such an amount that a ratio of a main peak intensity of the Na—Fe—Ti compound to a peak intensity of (104) plane of $FeTiO_3$—$Fe_2O_3$ is 0.01:1 to 1.00:1, when measured by an X-ray diffraction method.

In the eighth aspect of the present invention, there are provided black iron-based particles comprising:

(1) 80 to 99.9 parts by weight of a $FeTiO_3$—$Fe_2O_3$ solid solution or a mixed composition of a $FeTiO_3$—$Fe_2O_3$ solid solution and an iron-based oxide having a spinel structure; and (2) 0.1 to 20 parts by weight of a blue pigment, and having a Ti content of from more than 10.0 atm % to 40.0 atm %, calculated as Ti, based on whole Fe, a saturation magnetization value of 5 to 40 $Am^2/kg$, a blackness (L* value) of 6 to 13 and an average particle diameter of 0.04 to 0.24 μm.

In the ninth aspect of the present invention, there is provided a black non-magnetic toner comprising a binder resin and the black iron-based particles as defined in any one of the above aspects.

DETAILED DESCRIPTION OF THE INVENTION

Figure 1:
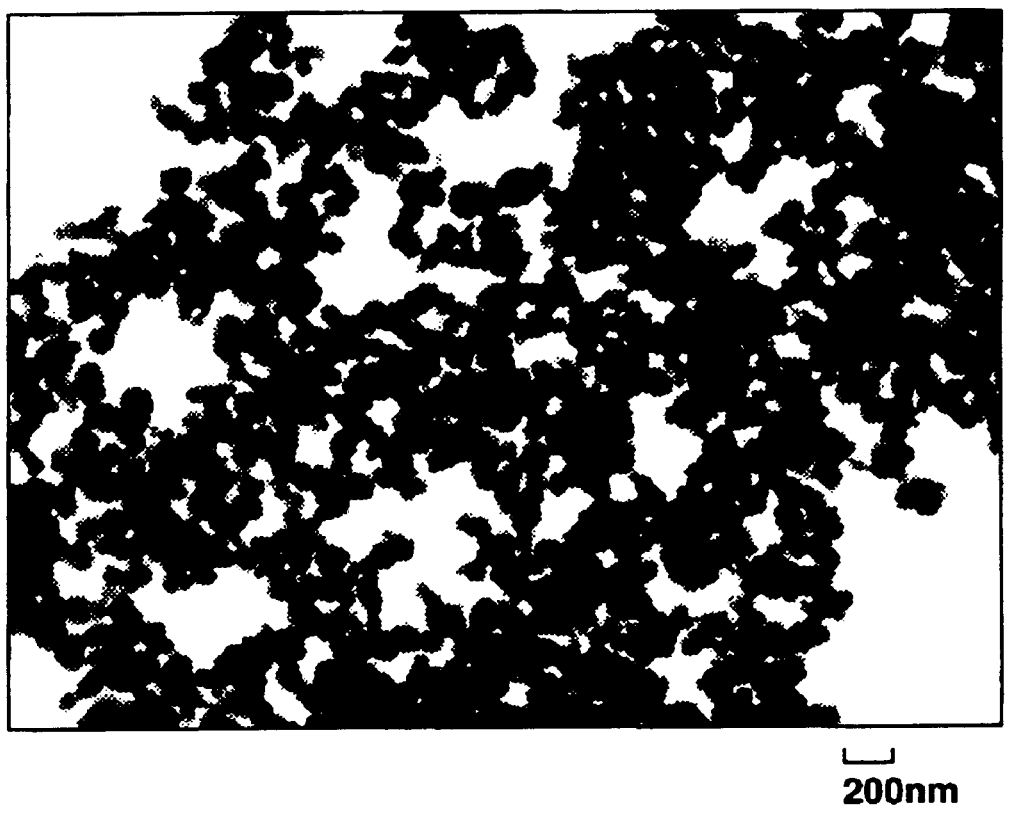
FIG. 1 is an electron micrograph (magnification: 20,000) showing black non-magnetic particles obtained in Example 1.

The present invention is described in detail below.

First, the black iron-based particles according to the present invention are explained.

The black iron-based particles according to the present invention comprises (1) a $FeTiO_3$—$Fe_2O_3$ solid solution or (2) a mixed composition of a $FeTiO_3$—$Fe_2O_3$ solid solution and an iron-based oxide having a spinel structure. The iron-based oxide having a spinel structure may be constituted by a $Fe_3O_4$—γ—$Fe_2O_3$ solid solution. When only $Fe_2O_3$ is contained, i.e., no $FeTiO_3$ is contained, the obtained particles tend to exhibit a red color and, therefore, tend to fail to exhibit the aimed blackness. Also, when only $FeTiO_3$ is contained, i.e., no $Fe_2O_3$ is contained, such particles may require a heat treatment at a higher temperature, so that the obtained particles tend to have a large particle diameter, thereby failing to attain a sufficient tinting strength.

The black iron-based particles of the present invention contain the $Fe_3O_4$—γ—$Fe_2O_3$ solid solution in such an amount that a ratio of a peak intensity of (220) plane of $Fe_3O_4$—γ—$Fe_2O_3$ to a peak intensity of (104) plane of $FeTiO_3$—$Fe_2O_3$ is usually 1:0.01 to 1:0.5, preferably 1:0.05 to 1:0.45, when measured by an X-ray diffraction method as described hereinafter. When the peak intensity ratio is 1:0.5 or more, the obtained particles tend to have a high magnetization value, so that it may be difficult to apply the particles to the current developing systems using non-magnetic toners.

The black iron-based particles of the present invention have a Ti content of usually from more than 10.0 atm % to 40.0 atm %, preferably 12 to 35 atm %, more preferably 20 to 33.3 atm % based on the whole Fe. When the Ti content is not more than 10.0 atm %, the obtained particles tend to have a high magnetization value, so that it may be difficult to apply the particles to the current developing systems using non-magnetic toners. When the Ti content is more than 40.0 atm %, an unreacted Ti compound tends to remain in the obtained particles, thereby failing to attain the aimed blackness and tinting strength.

The black iron-based particles of the present invention have a blackness (L* value) of usually 6 to 13, preferably 6 to 12.5, more preferably 6 to 11.5. When the blackness (L* value) is more than 13, the obtained particles tend to fail to show a sufficient blackness and, therefore, may be unusable as a black pigment. On the other hand, it is not possible to industrially produce such particles having a blackness (L* value) of less than 6.

The black iron-based particles of the present invention have a saturation magnetization value of usually not more than 60 $Am^2$/kg, preferably 0.1 to 40 $Am^2$/kg, more preferably 5 to 30 $Am^2$/kg, still more preferably 5 to 25 $Am^2$/kg. When the saturation magnetization value is more than 60 $Am^2$/kg, it may be difficult to apply the obtained particles to the current developing systems using non-magnetic toners, and further the obtained toner image tends to fail to exhibit a sufficient image density, and tends to suffer from fogging.

The black iron-based particles of the present invention have an average particle diameter of usually 0.01 to 0.50 $\mu$m, preferably 0.04 to 0.24 $\mu$m, more preferably 0.08 to 0.20 $\mu$m. When the average particle diameter is less than 0.01 $\mu$m, the obtained particles tend to fail to show a sufficient blackness. When the average particle diameter is more than 0.50 $\mu$m, the obtained particles tend to fail to show a sufficient tinting strength.

The black iron-based particles of the present invention have a BET specific surface area value of usually 3 to 30 $m^2$/g, preferably 6 to 30 $m^2$/g, more preferably 6.5 to 20 $m^2$/g. When the BET specific surface area value is less than 3 $m^2$/g, the obtained black non-magnetic particles tend to become coarse, or sintering within or between the particles tends to be caused, resulting in production of coarse particles having a poor tinting strength. When the BET specific surface area value is more than 30 $m^2$/g, it may be difficult to obtain particles having a sufficient blackness.

The black iron-based particles of the present invention have a tinting strength of usually 35 to 45, preferably 35 to 44, when measured by the below-mentioned drawdown evaluation method. When the tinting strength is more than 45, a black non-magnetic toner prepared from the black non-magnetic particles tends to fail to form a toner image having a sufficient image density. It may not be possible to industrially produce black non-magnetic particles having a tinting strength of less than 35.

The black iron-based particles of the present invention may further contain a Na—Fe—Ti compound. The black iron-based particles containing the Na—Fe—Ti compound can be further improved in blackness. Therefore, the black iron-based particles containing the Na—Fe—Ti compound can show a sufficient blackness even though $Fe_2TiO_5$ is included therein.

Examples of the Na—Fe—Ti compound may include $NaFeTi_3O_8$, $NaFeTiO_4$, $Na_{0.75}Fe_{0.75}Ti_{0.25}O_2$ or the like.

The amount of sodium contained in the black iron-based particles is usually not more than 10% by weight, preferably 0.01 to 7% by weight. When the sodium content is more than 10% by weight, the particles obtained after the calcination tend to contain an increased amount of the iron-based oxide having a spinel structure, so that it may be difficult to attain the desired magnetization value.

The amount of the Na—Fe—Ti compound may be contained in the black iron-based particles in such an amount that a ratio of a main peak intensity of the Na—Fe—Ti compound to a peak intensity of (104) plane of $FeTiO_3$—$Fe_2O_3$ is preferably 0.01:1 to 1.00:1, more preferably 0.01:1 to 0.7:1, still more preferably 0.01:1 to 0.5:1, when measured by an X-ray diffraction method as described hereinafter. When the peak intensity ratio is more than 1.00:1, the obtained particles tend to exhibit a high magnetization value, so that it may be difficult to apply the particles to the current developing systems using non-magnetic toners. Meanwhile, the "main peak" used herein means such a peak having a maximum peak intensity in X-ray diffraction. For example, the main peak of $NaFeTi_3O_8$ is a peak observed at a spacing (d) of 3.63 Å, the main peak of $NaFeTiO_4$ is a peak observed at (112) plane thereof, and the main peak of $Na_{0.75}Fe_{0.75}Ti_{0.25}O_2$ is a peak observed at (104) plane thereof.

The black iron-based particles containing the Na—Fe—Ti compound have substantially the same Ti content and average particle diameter as those of the above-mentioned black iron-based particles containing no Na—Fe—Ti compound. Further, the black iron-based particles containing the Na—Fe—Ti compound have a magnetization value of preferably 0.1 to 60 $Am^2$/kg, more preferably 0.1 to 40 $Am^2$/kg, a blackness (L* value) of preferably 6 to 12, more preferably 6 to 11, and a tinting strength of preferably 35 to 43.5, when measured by the below-mentioned drawdown evaluation method.

The black iron-based particles of the present invention may contain a blue pigment. In the blue pigment-containing black iron-based particles, the blue pigment may be present with the $FeTiO_3$—$Fe_2O_3$ solid solution (1) or the mixed composition (2) composed of $FeTiO_3$—$Fe_2O_3$ solid solution and the iron-based oxide having a spinel structure. Alternatively, the blue pigment may be adhered on the surface of each particle composed of the $FeTiO_3$—$Fe_2O_3$ solid solution, or the mixed composition of the $FeTiO_3$—$Fe_2O_3$ solid solution and the iron-based oxide having a spinel structure. The black iron-based particles having the blue pigment can be further improved in blackness and tinting strength.

The amount of the blue pigment is usually not more than 20% by weight, preferably 0.1 to 20% by weight, more preferably 1 to 10% by weight. When the blue pigment content is more than 20%, the obtained particles tend to exhibit a hue closer to that of the blue pigment due to too large amount of the blue pigment, thereby failing to show the desired blackness.

The black iron-based particles having the blue pigment have substantially the same composition, average particle diameter and magnetization value as those of the above-mentioned black iron-based particles having no blue pigment. More specifically, the black iron-based particles having the blue pigment, have a blackness (L* value) of preferably 6 to 12, more preferably 6 to 11, and a tinting strength of preferably 30 to 42, when measured by the below-mentioned drawdown evaluation method.

The blue pigment used in the present invention is not restricted to particular ones. Examples of the blue pigment may include known blue pigments such as alkali blue, phthalocyanine blue, cobalt blue and ultramarine blue.

Meanwhile, the black iron-based particles may contain, in addition to iron and titanium, at least one element selected from the group consisting of K, Ca, Sr, Ba, Zr, Mg, Al, Si, P, Mn, Co, Ni, Cu, Zn or the like, in an amount of not more than 10 atm % based on a total amount of iron and titanium.

Next, the black toner (black non-magnetic toner) of the present invention is described.

The black toner of the present invention comprises the black iron-based particles according to the present invention, and a binder resin, and may further optionally contain a mold release agent, a colorant, a charge controller and other additives, if required.

The black toner has an average particle diameter of usually 3 to 15 $\mu$m, preferably 5 to 12 $\mu$m, and as low a magnetization value (saturation magnetization value) as possible, e.g., usually not more than 30 Am²/kg, preferably not more than 20 Am²/kg.

The mixing ratio of the binder resin and the black iron-based particles may be determined such that the black iron-based particles is contained in an amount of usually 0.1 to 900 parts by weight, preferably 17 to 185 parts by weight based on 100 parts by weight of the binder resin.

Examples of the binder resin may include polyester resins, styrene-acrylic copolymer resins, and vinyl-based polymers or copolymers obtained by polymerizing or copolymerizing vinyl-based monomers such as styrene, acrylic acid alkyl esters and methacrylic acid alkyl esters. Examples of the styrene monomers may include styrene and substituted styrenes. Examples of the acrylic acid alkyl ester monomers may include acrylic acid, methyl acrylate, ethyl acrylate, butyl acrylate or the like. The above copolymers may preferably contain styrene-based components in an amount of 50 to 95% by weight.

As the binder resin, the above vinyl-based polymers or copolymers may be used in combination with polyester-based resins, epoxy-based resins, polyurethane-based resins, etc.

The black toner of the present invention shows an image density of images of preferably not less than 1.25.

Next, the process for producing the black iron-based particles according to the present invention is described.

The black iron-based particles of the present invention can be produced by coating the surface of magnetite particles having a $Fe^{2+}$ content of usually 17 to 28% by weight, preferably 18 to 27% by weight (calculated as FeO), with a titanium compound, heat-calcining the thus coated magnetite particles at a temperature of usually 650 to 880° C. under a non-oxidative atmosphere, and then pulverizing the thus calcined particles.

When the magnetite particles used in the present invention have a $Fe^{2+}$ content of less than 17% by weight (calculated as FeO), unnecessary phases are formed in the obtained particles, resulting in deteriorated blackness thereof. It may be difficult to industrially produce magnetite particles having a $Fe^{2+}$ content of more than 28% by weight.

The magnetite particles used in the present invention have an average particle diameter of usually 0.007 to 0.4 µm, preferably 0.01 to 0.3 µm, more preferably 0.02 to 0.2 µm, a BET specific surface area value of usually 7.5 to 50 m²/g, preferably 8 to 30 m²/g.

The magnetite particles may be produced by ordinary methods, for example, by passing an oxygen-containing gas through a ferrous salt reaction solution containing ferrous hydroxide colloid obtained by reacting an aqueous ferrous salt solution with an aqueous alkali solution.

Examples of the titanium compound used in the present invention may include titanyl sulfate, titanium tetrachloride, titanium trichloride or the like.

The amount of the titanium compound added is usually 10 to 40 atm %, preferably 12 to 35 atm %, more preferably 20 to 33.3 atm % based on whole Fe.

Upon coating the magnetite particles with the titanium compound (titanium oxide hydroxide), it is important to add the titanium compound to a water suspension containing the magnetite particles and simultaneously prevent the pH value of the water suspension from being lowered, by adding an aqueous alkali hydroxide solution or an aqueous alkali carbonate solution thereto. When no alkali solution is added and, as a result, the pH value is lowered, the elution of iron may be caused, so that $Fe_2TiO_5$ may be formed after the calcination, resulting in insufficient blackness of the obtained particles. However, when the Na—Fe—Ti compound is contained, the obtained particles can show a sufficient blackness even though $Fe_2TiO_5$ is formed therein. Therefore, upon adding the titanium compound, the pH value of the water suspension may be lowered without addition of the alkali solution.

Meanwhile, when different kinds of metal elements are incorporated into the black iron-based particles, these elements may be previously contained in the magnetite particles, or various salts of the metal elements or a solution containing these metal elements may be added to the aqueous solution containing the magnetite particles whose surface is coated with the titanium compound.

The heat-calcination of the present invention is performed under a non-oxidative atmosphere. Under an oxidative atmosphere, it may be difficult to obtain the black iron-based particles having a high blackness.

The heat-calcination of the present invention is performed in a temperature range of usually 650 to 880° C., preferably 700 to 850° C. When the heat-calcination temperature is less than 650° C., the solid phase reaction between the magnetite particles and the Ti compound tends to become insufficient, so that it may be difficult to obtain the aimed black iron-based particles. When the heat-calcination temperature is more than 880° C., the sintering within or between the particles tends to be caused, resulting in production of coarse particles.

The black iron-based particles containing the Na—Fe—Ti compound can be produced (i) by adding the titanium compound and then a sodium compound to a water suspension containing the magnetite particles, and then drying the thus obtained particles; or (ii) by preparing magnetite particles, adding a titanium compound to a water suspension containing the magnetite particles, filtering out and water-washing the particles, and then dry-mixing the obtained particles with a sodium compound. The thus produced black iron-based particles containing the Na—Fe—Ti compound are heat-calcined in a temperature range of 650 to 880° C. under a non-oxidative atmosphere, and then pulverized.

Examples of the sodium compound used in the above production method may include sodium hydroxide, sodium sulfate, sodium carbonate, sodium chloride or the like. Meanwhile, as the sodium compound, there may be used sodium hydroxide or sodium carbonate in the form of the aqueous alkali hydroxide solution or the aqueous alkali carbonate solution which is used to allow the water suspension to maintain the pH value immediately after adding the titanium compound thereto without lowering upon coating the surface of the magnetite particles with the titanium compound (titanium oxide hydroxide).

In order to produce the black iron-based particles having the blue pigment, the blue pigment may be added to the black iron-based particles upon pulverization thereof. In order to adhere the blue pigment onto the surface of the black iron-based particles, the blue pigment may be bonded or coated on the surface of the respective particles composed of (1) the $FeTiO_3$—$Fe_2O_3$ solid solution or (2) the mixed composition of the $FeTiO_3$—$Fe_2O_3$ solid solution and the iron-based oxide having a spinel structure, through a gluing agent. As the gluing agent, there may be used organosilane compounds obtainable from alkoxysilanes, or polysiloxanes.

Next, the process for producing the black non-magnetic toner according to the present invention is described.

In the present invention, the black non-magnetic toner can be produced by known methods in which a predetermined amount of the binder resin and a predetermined amount of the black non-magnetic particles are subjected to mixing, kneading and pulverization. For example, a mixture containing the black non-magnetic particles and the binder resin, and further optionally containing a mold release agent, a colorant, a charge controller and other additives, if required, is intimately mixed by a mixer, heat-kneaded by a heating kneader to disperse the black non-magnetic particles, etc. in the binder resin, and then cooled and solidified to obtain a kneaded resin material. The thus obtained kneaded resin material is then subjected to pulverization and classification to obtain particles having a desired particle diameter.

As the mixer, there may be used a Henschel mixer, a ball mill or the like. As the heating kneader, there may be used a roll mill, a kneader, a twin-screw extruder or the like. The pulverization of particles may be performed using a pulverizer such as a cutter mill and a jet mill, and the classification may be performed using a known air classifier.

The black non-magnetic toner may also be produced by a suspension polymerization method or an emulsion polymerization method. In the suspension polymerization method, the black non-magnetic toner may be produced by dissolving and dispersing a mixture containing a polymerizable monomer and black magnetic iron oxide particles and further optionally containing a colorant, a polymerization initiator, a cross-linking agent, a charge controller and other additives, if required, to obtain a monomer composition, adding the obtained monomer composition to a water phase containing a suspension stabilizer while stirring to obtain granulated particles, and then polymerizing the granulated particles to obtain a toner having a desired particle diameter. In the emulsion polymerization method, the black non-magnetic toner may be produced by dispersing a monomer and black non-magnetic particles together with a colorant, a polymerization initiator, etc., if required, in a water, and polymerizing the water dispersion while adding an emulsifier thereto to obtain a toner having a desired particle diameter.

The reason why the black iron-based particles of the present invention can exhibit an excellent blackness, is considered to be that since iron-based oxide having a spinel structure containing a large amount of $Fe^{2+}$ is used as raw particles, the production of unnecessary phases adversely affecting the blackness can be inhibited even when subjecting the particles to heat-treatment.

The reason why the black iron-based particles of the present invention can exhibit not only an excellent blackness but also a low magnetization value, is considered to be that the amount of the iron-based oxide having a spinel structure used is as low as possible.

Further, according to the present invention, since the blue pigment is included as additives in the black non-magnetic particles or adhered onto the surface of the black non-magnetic particles, the blackness and tinting strength of the obtained particles can be further enhanced.

Thus, the black iron-based particles of the present invention are suitably used as black-colored pigments and paints, coloring materials for resin compositions, fillers, etc., because of an excellent blackness and a less magnetization value thereof.

Furthermore, the black non-magnetic toner produced using the black iron-based particles of the present invention are suitable as a non-magnetic toner since the non-magnetic toner can exhibit not only a high blackness but also a low magnetization value.

EXAMPLES

The present invention will now be described in more detail with reference to the following examples, but the present invention is not restricted to those examples and various modifications are possible within the scope of the invention.

Various properties were evaluated by the following methods.

(1) The average particle diameter of the respective particles is expressed by the average value of diameters of 350 particles measured on an electron micrograph thereof.

(2) The phase constituting the particles was identified by an X-ray diffraction method (tube used: Cu). Also, the peak intensity ratio between $FeTiO_3$—$Fe_2O_3$ solid solution and $Fe_3O_4$—$\gamma$—$Fe_2O_3$ solid solution was determined by calculating a ratio of a peak intensity of (220) plane of the $Fe_3O_4$—$\gamma$—$Fe_2O_3$ solid solution to a peak intensity of (104) plane of the $FeTiO_3$—$Fe_2O_3$ solid solution.

(3) The specific surface area value of the particles was measured by a BET method using "Mono Sorb MS-II" (manufactured by Yuasa Ionics Co., Ltd.).

(4) The magnetic properties of the black iron-based particles were measured under a magnetic field of 796 kA/m (10 kOe) using a vibration sample magnetometer "VSM-3S-15" (manufactured by Toei Kogyo Co., Ltd.).

(5) The contents of metal elements such as Ti, Al, Si, K and Cu which were contained in the black iron-based particles, were measured by a calibration curve method using a "Fluorescent X-ray Analyzer RIX-2100 Model" (manufactured by Rigaku Denki Kogyo Co., Ltd.).

(6) The $Fe^{2+}$ content is expressed by the value measured by the following chemical analysis method.

That is, 25 cc of a mixed solution containing phosphoric acid and sulfuric acid at a mixing ratio of 2:1 was added to 0.5 g of black magnetic iron oxide particles or black iron-based particles under an inert gas atmosphere to dissolve the black magnetic iron oxide particles or black iron-based particles therein. The thus obtained solution was diluted, and several droplets of diphenylamine sulfonic acid as an indicator were dropped to the diluted solution. Then, the obtained solution was subjected to oxidation-reduction titration using an aqueous potassium bichromate solution. The $Fe^{2+}$ content was calculated from the amount of the aqueous potassium bichromate solution used until reaching a terminal point at which the above diluted solution exhibited a violet color.

(7) The blackness of the black iron-based particles was measured as follows.

That is, 0.5 g of a sample and 0.5 ml of castor oil were intimately kneaded together by a Hoover's muller to form a paste. 4.5 g of a clear lacquer was added to the obtained paste and was intimately kneaded to form a paint. The obtained paint was applied on a cast-coated paper by using a 150 μm (6-mil) applicator to produce a coating film piece (having a film thickness of about 30 μm). The color of the thus obtained coating film piece was measured by a spectrocolorimeter "COLOR GUIDE" (manufactured by BYK-Gardner GmbH), and the blackness thereof was expressed by a color specification index (L* value) according to JIS Z 8929.

(8) The tinting strength of the black iron-based particles was measured as follows.

That is, 0.5 g of a sample, 0.5 ml of castor oil and 1.5 g of titanium dioxide were intimately kneaded together by a Hoover's muller to form a paste. 4.5 g of a clear lacquer was added to the obtained paste and was intimately kneaded to form a paint. The obtained paint was applied on a cast-coated paper by using a 150 μm (6-mil) applicator to produce a coating film piece (having a film thickness of about 30 μm). The color of the thus obtained coating film piece was measured by a spectro-colorimeter "COLOR GUIDE" (manufactured by BYK-Gardner GmbH), and the tinting strength thereof was expressed by a color specification index ($L^*$ value) according to JIS Z 8929.

(9) The image density of images obtained using the black toner was determined by printing a solid black (A4) with the prepared black toner using an electrophotographic printer "MICROLINE 600CL" (manufactured by Oki Denki Kogyo Co., Ltd.) and then measuring an image density of the solid black using by an image density-measuring device (tradename: "RD914", manufactured by MACBETH Co., Ltd.). The larger the measured value, the more excellent the image density.

(10) The fogging caused by the black toner was evaluated as follows.

That is, the same solid black (A4) as used above for measuring the blackness of the electrophotographic toner was visually observed to determine whether or not any fogging was caused thereon. The results are classified into the following four ranks.

A: Excellent (no fogging)

B: Good (substantially no fogging)

C: Still usable (slight fogging)

D: unusable

Example 1

<Production of Black Iron-based Particles>

An aqueous solution containing 38.9 mol of titanyl sulfate (corresponding to 30 atm % (calculated as Ti) based on whole Fe contained in magnetite particles) was added to a water suspension containing 10 kg of spherical magnetite particles (average particle diameter: 0.15 μm; BET specific area: 10.8 $m^2/g$; FeO content: 25.6% by weight). Meanwhile, upon the addition, an aqueous NaOH solution was added to the resultant mixed solution so as not to lower the pH value of the reaction solution. Then, after adjusting the pH value of the mixed solution to 8.0 to precipitate and deposit titanium oxide hydroxide on the surface of the magnetite particles, the obtained particles were filtered out, washing and then dried to obtain spherical black magnetic iron oxide particles whose surface was coated with the titanium oxide hydroxide.

10 kg of the thus obtained spherical black magnetic iron oxide particles whose surface was coated with the titanium oxide hydroxide were heat-calcined under a $N_2$ gas flow at 750° C. for 60 minutes, and then pulverized to obtain black iron-based particles.

Figure 2:
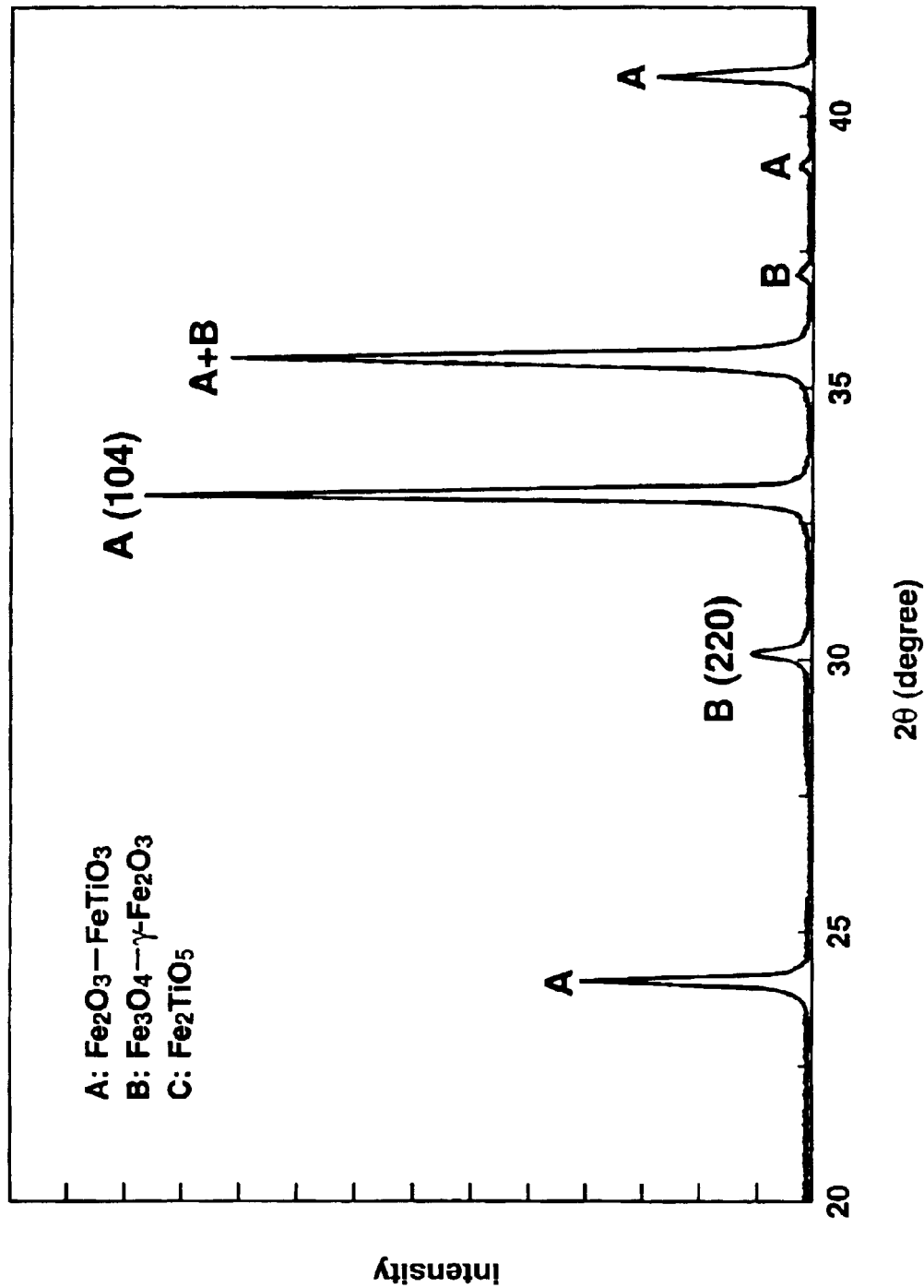
FIG. 2 is an X-ray diffraction pattern of the black non-magnetic particles obtained in Example 1.

As a result, it was confirmed that the thus obtained black iron-based particles had a Ti content of 29.9 atm % based on whole Fe, a saturation magnetization value σs of 10.5 $Am^2/kg$, a blackness ($L^*$ value) of 9.7, a tinting strength of 40.4, and an average particle diameter 0.17 μm as shown in the electron micrograph of FIG. 1. In addition, as shown in the X-ray diffraction pattern of FIG. 2, the black iron-based particles were composed of a mixed composition of $FeTiO_3$—$Fe_2O_3$ solid solution and $Fe_3O_4$—$\gamma$—$Fe_2O_3$ solid solution, and the ratio of a peak intensity of (220) plane of $FeTiO_3$—$Fe_2O_3$ to a peak intensity of (104) plane of $FeTiO_3$—$Fe_2O_3$ solid was 1:0.09.

<Production of Electrophotographic Black Toner>

The above prepared black iron-based particles were mixed with the following components at a mixing ratio shown below using a Henschel mixer, and the obtained composition was melt-kneaded by a twin-screw extrusion kneader (tradename: "S-1" manufactured by Kurimoto Tekkosha Co., Ltd.). The obtained kneaded material was cooled, finely pulverized and then classified to separate particles having an volume-average particle diameter of 8 to 10 μm (measured using "Multisizer" (tradename) manufactured by Coulter Counter Co., Ltd.), thereby obtaining toner particles. Further, 0.5 part by weight of hydrophobic finer silica powder (tradename "RX-200" produced by Nippon Aerojil Co., Ltd.) was externally added to 100 parts by weight of the thus obtained toner particles, thereby obtaining an electrophotographic black toner.

Composition:

| | |
|---|---|
| Styrene-acrylic copolymer resin ("HI-MER SB-308" produced by Sanyo Kasei Kogyo Co., Ltd.) | 100 parts by weight |
| Black iron-based particles | 25 parts by weight |
| Negative charge controller ("BONTRON E-84" produced by Orient Kagaku Kogyo Co., Ltd.) | 0.5 part by weight |
| Low-molecular weight wax ("BISCOL 550-P" produced by Sanyo Kasei Kogyo Co., Ltd.) | 5 parts by weight |

As a result, it was confirmed that the thus obtained electrophotographic black toner had an initial image density of 1.45 and was free from fogging (rank: A in four-rank evaluation).

Examples 2 to 12 and Comparative Examples 2 to 8

The same procedure as defined in Example 1 was conducted except that kind of magnetite, amount of the titanium compound added and heat-calcination treatment temperature were changed variously, thereby obtaining black iron-based particles.

The essential production conditions are shown in Table 1, and various properties of the obtained black non-magnetic particles are shown in Table 2.

Comparative Example 1

(Follow-Up Test of Example 1 of Japanese Patent Application Laid-Open (KOKAI) No. 3-2276(1991))

100 g of granular magnetite particles (average particle diameter: 0.2 μm; magnetization value: 85.0 emu/g) were mixed and dispersed in an aqueous solution containing 0.26 mol of $TiOSO_4$ (corresponding to Ti/Fe=20.0 atm %). Then, the obtained mixed solution was neutralized by adding NaOH thereto, and the pH value thereof was adjusted to 8, thereby precipitating and depositing a hydroxide of Ti on the surface of the magnetite particles. Thereafter, the thus obtained particles were filtered out and then dried. As a result of fluorescent X-ray analysis, it was confirmed that the obtained granular magnetite particles whose surface was coated with the hydroxide of Ti had a Ti (IV) content of 21.0 atm % based on a sum of Fe (II) and Fe (III).

50 g of the thus obtained granular magnetite particles whose surface was coated with the hydroxide of Ti were heat-calcined under a $N_2$ gas flow at 750° C. for 120 minutes, and then pulverized to obtain black particles.

Figure 3:
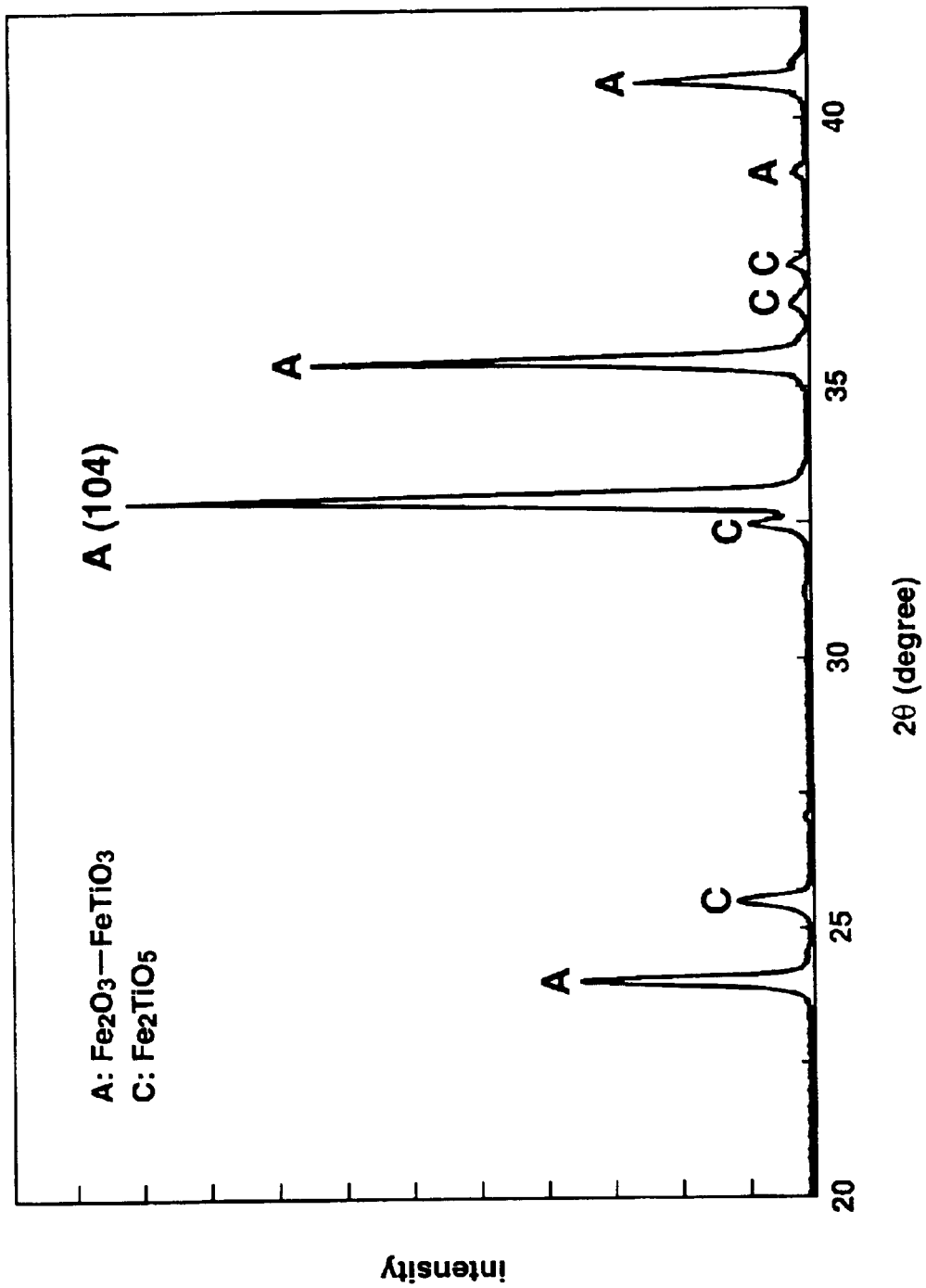
FIG. 3 is an X-ray diffraction pattern of black non-magnetic particles obtained in Comparative Example 1.

As a result, it was confirmed that the obtained black particles had a Ti content of 21.0 atm % based on whole Fe, a saturation magnetization value σs of 0.6 $Am^2/kg$, a blackness ($L^*$ value) of 14.1, a tinting strength of 46.9 and an average particle diameter of 0.25 μm, and that as shown in the X-ray diffraction pattern of FIG. 3, the black particles were composed of a mixed composition of $Fe_2O_3$—$FeTiO_3$ solid solution and $Fe_2TiO_5$.

The essential production conditions are shown in Table 1, and various properties of the obtained black iron-based particles are shown in Table 2.

Meanwhile, in Comparative Examples 6 and 7, in addition to the mixed composition of $Fe_2O_3$—$FeTiO_3$ and $Fe_2O_3$, unreacted titanium compound remained in the obtained particles.

Examples 13 to 17

The same procedures as defined in Examples 1 to 5 were conducted except that the respective blue pigments were added upon the pulverization treatment, thereby obtaining black non-magnetic particles.

The essential production conditions and various properties of the obtained black iron-based particles are shown in Table 3.

Examples 18 to 33 and Comparative Examples 10 to 16

<Production of Black Toner>

The same procedure as defined in Example 1 was conducted except that kind of the black non-magnetic particles was changed variously, thereby obtaining black toners.

The essential treatment conditions and various properties of the obtained black toners are shown in Tables 4 and 5.

Example 34

<Production of Black Iron-based Particles>

An aqueous solution containing 37.6 mol of titanyl sulfate (corresponding to 29 atm % (calculated as Ti) based on whole Fe contained in magnetite particles) was added to a water suspension containing 10 kg of spherical magnetite particles (average particle diameter: 0.15 μm; BET specific area: 10.8 m²/g). Then, after adjusting the pH value of the resultant mixed solution to 8.0 to precipitate and deposit titanium oxide hydroxide on the surface of the magnetite particles, the obtained particles were filtered out, washed with water and then dried.

The thus obtained spherical black magnetic iron oxide particles whose surface was coated with the titanium oxide hydroxide were mixed with 420 g of sodium sulfate. Then, 10 kg of the thus obtained mixture was heat-calcined under a $N_2$ gas flow at 750° C. for 60 minutes and then pulverized to obtain black non-magnetic particles.

Figure 4:
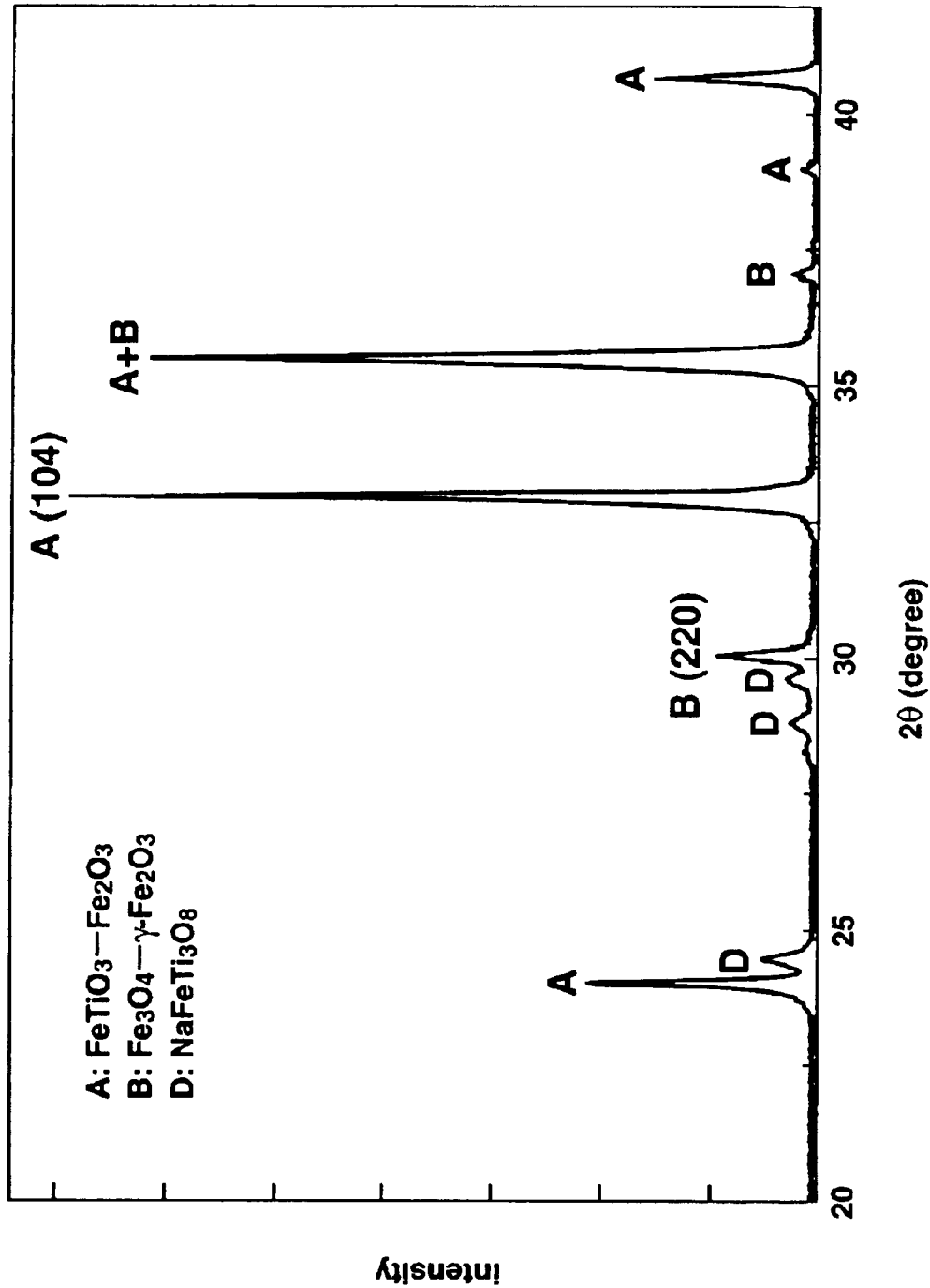
FIG. 4 is an X-ray diffraction pattern of the black non-magnetic particles obtained in Example 34.

As a result, it was confirmed that the thus obtained black iron-based particles had a Ti content of 29.8 atm % based on whole Fe, a saturation magnetization value (s of 12 $Am^2/kg$, a blackness (L* value) of 9.2, a tinting strength of 40.2 and a BET specific surface area of 8.5 $m^2/g$. In addition, as shown in the X-ray diffraction pattern of FIG. 4, the black iron-based particles were composed of a mixed composition of $FeTiO_3$—$Fe_2O_3$ solid solution, $Fe_3O_4$—$\gamma$—$Fe_2O_3$ solid solution and $NaFeTi_3O_8$, and the ratio of a main peak (peak at a spacing (d) of 3.63 Å) intensity of $NaFeTi_3O_8$ to a peak intensity of (104) plane of $FeTiO_3$—$Fe_2O_3$ was 0.08:1.

<Production of Electrophotographic Toner>

The above prepared black iron-based particles were mixed with the following components at a mixing ratio shown below using a Henschel mixer, and the obtained composition was melt-kneaded by a twin-screw extrusion kneader (tradename: "S-1" manufactured by Kurimoto Tekkosha Co., Ltd.). The obtained kneaded material was cooled, finely pulverized and then classified to separate particles having an volume-average particle diameter of 8 to 10 μm (measured using "Multisizer" (tradename) manufactured by Coulter Counter Co., Ltd.), thereby obtaining toner particles.

Further, 0.5 part by weight of hydrophobic finer silica powder (tradename "RX-200" produced by Nippon Aerojil Co., Ltd.) was externally added to 100 parts by weight of the thus obtained toner particles, thereby obtaining an electrophotographic toner.

Composition:

| | |
|---|---|
| Styrene-acrylic copolymer resin ("HI-MER SB-308" produced by Sanyo Kasei Kogyo Co., Ltd.) | 100 parts by weight |
| Black iron-based particles | 25 parts by weight |
| Negative charge controller ("BONTRON E-84" produced by Orient Kagaku Kogyo Co., Ltd.) | 0.5 part by weight |
| Low-molecular weight wax ("BISCOL 550-P" produced by Sanyo Kasei Kogyo Co., Ltd.) | 5 parts by weight |

As a result, it was confirmed that the thus obtained electrophotographic toner had an initial image density of 1.45 and was free from fogging (rank: A in four-rank evaluation).

The essential production conditions are shown in Table 6, and various properties of the obtained black non-magnetic particles are shown in Table 7.

Examples 35 and 36

The same procedure as defined in Example 34 was conducted except that kind of magnetite, amount of the titanium compound added, amount of the sodium compound added and heat-calcination treatment temperature were changed variously, thereby producing black iron-based particles.

The essential production conditions are shown in Table 6, and various properties of the obtained black iron-based particles are shown in Table 7.

Example 37

The same procedure as defined in Example 34 was conducted except that the blue pigment was added upon the pulverization treatment, thereby obtaining black non-magnetic particles.

Various properties of the obtained black non-magnetic particles are shown in Table 8.

Examples 38 and 41

<Production of Black Toner>

The same procedure as defined in Example 34 was conducted except that kind of the black non-magnetic particles was changed variously, thereby obtaining black toners.

The essential treatment conditions and various properties of the obtained black toners are shown in Table 9.

TABLE 1

| Examples and Comparative Examples | Properties of magnetite particles | |
|---|---|---|
| | Kind | Average particle diameter (μm) |
| Example 1 | Spherical magnetite | 0.15 |
| Example 2 | Spherical magnetite | 0.18 |
| Example 3 | Spherical magnetite | 0.15 |
| Example 4 | Spherical magnetite | 0.10 |
| Example 5 | Spherical magnetite | 0.10 |
| Example 6 | Spherical magnetite | 0.04 |
| Example 7 | Spherical magnetite | 0.10 |

TABLE 1-continued

| | | |
|---|---|---|
| Example 8 | Spherical magnetite | 0.15 |
| Example 9 | Spherical magnetite | 0.15 |
| Example 10 | Octahedral magnetite | 0.17 |
| Example 11 | Octahedral magnetite | 0.17 |
| Example 12 | Spherical magnetite | 0.18 |
| Comparative Example 1 | Granular magnetite | 0.20 |
| Comparative Example 2 | Spherical magnetite | 0.10 |
| Comparative Example 3 | Spherical magnetite | 0.02 |
| Comparative Example 4 | Spherical magnetite | 0.23 |
| Comparative Example 5 | Spherical magnetite | 0.15 |
| Comparative Example 6 | Spherical magnetite | 0.15 |
| Comparative Example 7 | Spherical magnetite | 0.15 |
| Comparative Example 8 | Spherical magnetite | 0.15 |

| | Properties of magnetite particles | | |
|---|---|---|---|
| Examples and Comparative Examples | BET specific surface area value ($m^2/g$) | FeO content (wt %) | Saturation magnetization value $\sigma s$ ($Am^2/kg$) |
| Example 1 | 10.8 | 25.6 | 82 |
| Example 2 | 9.7 | 26.0 | 83 |
| Example 3 | 10.8 | 25.6 | 82 |
| Example 4 | 14.8 | 25.1 | 82 |
| Example 5 | 14.8 | 25.1 | 82 |
| Example 6 | 29.7 | 18.2 | 80 |
| Example 7 | 14.8 | 25.1 | 82 |
| Example 8 | 10.8 | 25.6 | 82 |
| Example 9 | 10.8 | 25.6 | 82 |
| Example 10 | 8.1 | 26.7 | 85 |
| Example 11 | 8.1 | 26.7 | 85 |
| Example 12 | 9.7 | 26.0 | 83 |
| Comparative Example 1 | 7.9 | 16.5 | 85 |
| Comparative Example 2 | 14.7 | 13.4 | 80 |
| Comparative Example 3 | 52.3 | 10.7 | 75 |
| Comparative Example 4 | 7.1 | 26.2 | 88 |
| Comparative Example 5 | 10.8 | 25.6 | 82 |
| Comparative Example 6 | 10.8 | 25.6 | 82 |
| Comparative Example 7 | 10.8 | 25.6 | 82 |
| Comparative Example 8 | 10.8 | 25.6 | 82 |

| | Coating treatment with Ti compound | | Different kinds of metal elements | |
|---|---|---|---|---|
| Examples and Comparative Examples | Kind | Ti/whole Fe (atm %) | Kind | Amount added (atm %) |
| Example 1 | $TiOSO_4$ | 30 | — | — |
| Example 2 | $TiCl_4$ | 30 | — | — |
| Example 3 | $TiOSO_4$ | 21 | — | — |
| Example 4 | $TiCl_4$ | 26 | — | — |
| Example 5 | $TiOSO_4$ | 12 | — | — |
| Example 6 | $TiCl_4$ | 35 | — | — |
| Example 7 | $TiCl_4$ | 30 | Si | 1 |
| Example 8 | $TiOSO_4$ | 30 | Cu | 5 |
| Example 9 | $TiOSO_4$ | 24 | Al | 8 |
| Example 10 | $TiCl_4$ | 30 | — | — |
| Example 11 | $TiCl_4$ | 35 | — | — |
| Example 12 | $TiCl_4$ | 30 | K | 1 |
| Comparative Example 1 | $TiOSO_4$ | 20 | — | — |
| Comparative Example 2 | $TiCl_4$ | 30 | — | — |
| Comparative Example 3 | $TiOSO_4$ | 30 | — | — |
| Comparative Example 4 | $TiOSO_4$ | 30 | — | — |
| Comparative Example 5 | $TiOSO_4$ | 8 | — | — |
| Comparative Example 6 | $TiOSO_4$ | 50 | — | — |
| Comparative Example 7 | $TiCl_4$ | 30 | — | — |
| Comparative Example 8 | $TiCl_4$ | 30 | — | — |

| | Heat-treatment | |
|---|---|---|
| Examples and Comparative Examples | Temperature (° C.) | Time (min) |
| Example 1 | 750 | 60 |
| Example 2 | 750 | 60 |
| Example 3 | 750 | 60 |
| Example 4 | 750 | 60 |
| Example 5 | 750 | 60 |
| Example 6 | 750 | 60 |
| Example 7 | 750 | 60 |
| Example 8 | 750 | 60 |
| Example 9 | 750 | 60 |
| Example 10 | 750 | 60 |
| Example 11 | 770 | 60 |
| Example 12 | 750 | 60 |
| Comparative Example 1 | 750 | 120 |
| Comparative Example 2 | 750 | 60 |
| Comparative Example 3 | 750 | 60 |
| Comparative Example 4 | 750 | 60 |
| Comparative Example 5 | 750 | 60 |
| Comparative Example 6 | 750 | 60 |
| Comparative Example 7 | 600 | 60 |
| Comparative Example 8 | 900 | 60 |

TABLE 2

| | Properties of black iron-based particles | |
|---|---|---|
| Examples and Comparative Examples | Average particle diameter ($\mu m$) | Composition |
| Example 1 | 0.17 | $Fe_2O_3$—$FeTiO_3$ + $Fe_3O_4$-$\gamma$-$Fe_2O_3$ |
| Example 2 | 0.20 | $Fe_2O_3$—$FeTiO_3$ + $Fe_3O_4$-$\gamma$-$Fe_2O_3$ |
| Example 3 | 0.16 | $Fe_2O_3$—$FeTiO_3$ + $Fe_3O_4$-$\gamma$-$Fe_2O_3$ |
| Example 4 | 0.12 | $Fe_2O_3$—$FeTiO_3$ + $Fe_3O_4$-$\gamma$-$Fe_2O_3$ |
| Example 5 | 0.11 | $Fe_2O_3$—$FeTiO_3$ + $Fe_3O_4$-$\gamma$-$Fe_2O_3$ |
| Example 6 | 0.08 | $Fe_2O_3$—$FeTiO_3$ |
| Example 7 | 0.11 | $Fe_2O_3$—$FeTiO_3$ + $Fe_3O_4$-$\gamma$-$Fe_2O_3$ |
| Example 8 | 0.17 | $Fe_2O_3$—$FeTiO_3$ + $Fe_3O_4$-$\gamma$-$Fe_2O_3$ |
| Example 9 | 0.18 | $Fe_2O_3$—$FeTiO_3$ + $Fe_3O_4$-$\gamma$-$Fe_2O_3$ |
| Example 10 | 0.19 | $Fe_2O_3$—$FeTiO_3$ + $Fe_3O_4$-$\gamma$-$Fe_2O_3$ |
| Example 11 | 0.21 | $Fe_2O_3$—$FeTiO_3$ |
| Example 12 | 0.21 | $Fe_2O_3$—$FeTiO_3$ + $Fe_3O_4$-$\gamma$-$Fe_2O_3$ |
| Comparative Example 1 | 0.25 | $Fe_2O_3$—$FeTiO_3$ + $Fe_2TiO_5$ |
| Comparative Example 2 | 0.12 | $Fe_2O_3$—$FeTiO_3$ + $Fe_2TiO_5$ |

TABLE 2-continued

| | | |
|---|---|---|
| Comparative Example 3 | 0.15 | Fe$_2$O$_3$—FeTiO$_3$ + Fe$_2$TiO$_5$ |
| Comparative Example 4 | 0.26 | Fe$_2$O$_3$—FeTiO$_3$ + Fe$_3$O$_4$-γ-Fe$_2$O$_3$ |
| Comparative Example 5 | 0.11 | Fe$_2$O$_3$—FeTiO$_3$ + Fe$_3$O$_4$-γ-Fe$_2$O$_3$ |
| Comparative Example 6 | 0.18 | Fe$_2$O$_3$—FeTiO$_3$ + Fe$_3$O$_4$-γ-Fe$_2$O$_3$ |
| Comparative Example 7 | 0.12 | Fe$_2$O$_3$—FeTiO$_3$ + Fe$_3$O$_4$-γ-Fe$_2$O$_3$ |
| Comparative Example 8 | 0.25 | Fe$_2$O$_3$—FeTiO$_3$ + Fe$_2$TiO$_5$ |

| | Properties of black iron-based particles | | |
|---|---|---|---|
| Examples and Comparative Examples | Peak intensity ratio | Ti/whole Fe (atm %) | Different kinds of metal elements (atm %) |
| Example 1 | 1:0.09 | 29.9 | — |
| Example 2 | 1:0.12 | 29.8 | — |
| Example 3 | 1:0.29 | 21.8 | — |
| Example 4 | 1:0.22 | 25.7 | — |
| Example 5 | 1:0.40 | 12.0 | — |
| Example 6 | — | 34.6 | — |
| Example 7 | 1:0.08 | 29.6 | Si: 1.0 |
| Example 8 | 1:0.07 | 29.8 | Cu: 4.8 |
| Example 9 | 1:0.07 | 23.9 | Al: 7.9 |
| Example 10 | 1:0.15 | 29.9 | — |
| Example 11 | — | 35 | — |
| Example 12 | 1:0.10 | 29.9 | K: 1.0 |
| Comparative Example 1 | — | 21.0 | — |
| Comparative Example 2 | — | 29.8 | — |
| Comparative Example 3 | — | 29.9 | — |
| Comparative Example 4 | 1:0.14 | 30.0 | — |
| Comparative Example 5 | 1:0.41 | 7.9 | — |
| Comparative Example 6 | 1:0.20 | 49.3 | — |
| Comparative Example 7 | 1:0.47 | 30.0 | — |
| Comparative Example 8 | — | 29.8 | — |

| | Properties of black iron-based particles | | | |
|---|---|---|---|---|
| Examples and Comparative Examples | BET specific surface area value (m$^2$/g) | Saturation magnetization value (Am$^2$/kg) | Blackness (L*value) | Tinting strength |
| Example 1 | 9.0 | 10.5 | 9.7 | 40.4 |
| Example 2 | 7.1 | 14.9 | 9.2 | 41.3 |
| Example 3 | 10.2 | 32.0 | 9.3 | 38.7 |
| Example 4 | 11.8 | 21.8 | 9.9 | 39.6 |
| Example 5 | 13.2 | 38.8 | 10.7 | 38.9 |
| Example 6 | 18.7 | 5.8 | 12.3 | 40.9 |
| Example 7 | 13.0 | 11.2 | 10.3 | 39.8 |
| Example 8 | 8.8 | 9.1 | 8.9 | 39.0 |
| Example 9 | 8.1 | 9.3 | 11.1 | 41.2 |
| Example 10 | 7.6 | 16.6 | 9.5 | 41.0 |
| Example 11 | 6.8 | 0.3 | 12.5 | 42.5 |
| Example 12 | 6.9 | 13.0 | 8 | 41.4 |
| Comparative Example 1 | 5.8 | 0.6 | 14.1 | 46.9 |
| Comparative Example 2 | 12.6 | 0.2 | 14.3 | 46.2 |
| Comparative Example 3 | 10.1 | 0.4 | 16.5 | 44.4 |
| Comparative Example 4 | 5.2 | 15.2 | 9.1 | 46.0 |
| Comparative Example 5 | 14.0 | 42.4 | 11.0 | 41.9 |
| Comparative Example 6 | 12.2 | 4.6 | 15.2 | 48.1 |
| Comparative Example 7 | 14.1 | 46.9 | 16.0 | 51.2 |
| Comparative Example 8 | 5.6 | 1.8 | 13.8 | 46.8 |

TABLE 3

| | Iron-titanium composite oxide | Blue pigment | |
|---|---|---|---|
| Examples | | Kind | Amount added (wt %) |
| Example 13 | Example 2 | Cuphthalocyanine | 5 |
| Example 14 | Example 3 | Alkali blue | 10 |
| Example 15 | Example 4 | Alkali blue | 0.5 |
| Example 16 | Example 5 | Cuphthalocyanine | 10 |
| Example 17 | Example 6 | Cuphthalocyanine | 3 |

| Examples | Existing condition of blue pigment | BET specific surface area value (m$^2$/g) | Saturation magnetization value (Am$^2$/kg) |
|---|---|---|---|
| Example 13 | Surface coat | 7.4 | 13.8 |
| Example 14 | Included | 16.3 | 28.9 |
| Example 15 | Surface coat | 11.7 | 21.7 |
| Example 16 | Surface coat | 13.8 | 35.0 |
| Example 17 | Included | 19.9 | 5.6 |

| Examples | Blackness (L* value) | Tinting strength |
|---|---|---|
| Example 13 | 7.7 | 39.7 |
| Example 14 | 6.8 | 35.2 |
| Example 15 | 9.4 | 38.9 |
| Example 16 | 8.2 | 36.5 |
| Example 17 | 10.8 | 40.6 |

TABLE 4

| | | Properties of toner | | |
|---|---|---|---|---|
| Examples | Black iron-based particles used | Saturation magnetization value (Am$^2$/kg) | Initial image density | Fogging |
| Example 1 | Example 1 | 2.0 | 1.45 | A |
| Example 18 | Example 2 | 2.9 | 1.40 | A |
| Example 19 | Example 3 | 6.1 | 1.50 | B |
| Example 20 | Example 4 | 4.2 | 1.45 | B |
| Example 21 | Example 5 | 7.4 | 1.50 | B |
| Example 22 | Example 6 | 1.1 | 1.45 | B |
| Example 23 | Example 7 | 2.1 | 1.45 | A |
| Example 24 | Example 8 | 1.7 | 1.50 | A |
| Example 25 | Example 9 | 1.8 | 1.40 | A |
| Example 26 | Example 10 | 3.2 | 1.40 | A |
| Example 27 | Example 11 | 0.1 | 1.40 | A |
| Example 28 | Example 12 | 2.5 | 1.45 | A |
| Example 29 | Example 13 | 2.6 | 1.45 | A |
| Example 30 | Example 14 | 5.5 | 1.60 | B |
| Example 31 | Example 15 | 4.2 | 1.50 | B |
| Example 32 | Example 16 | 6.7 | 1.60 | B |
| Example 33 | Example 17 | 1.1 | 1.40 | B |

TABLE 5

| Comparative Examples | Black iron-based particles used | Properties of toner Saturation magnetization value (Am²/kg) |
|---|---|---|
| Comparative Example 9 | Comparative Example 1 | 0.1 |
| Comparative Example 10 | Comparative Example 2 | 0.0 |
| Comparative Example 11 | Comparative Example 3 | 0.1 |
| Comparative Example 12 | Comparative Example 4 | 4.6 |
| Comparative Example 13 | Comparative Example 5 | 8.1 |
| Comparative Example 14 | Comparative Example 6 | 0.9 |
| Comparative Example 15 | Comparative Example 7 | 9.0 |
| Comparative Example 16 | Comparative Example 8 | 0.3 |

| Comparative Examples | Properties of toner Initial image density | Fogging |
|---|---|---|
| Comparative Example 9 | 1.15 | A |
| Comparative Example 10 | 1.15 | A |
| Comparative Example 11 | 1.25 | B |
| Comparative Example 12 | 1.05 | A |
| Comparative Example 13 | 1.20 | C |
| Comparative Example 14 | 1.10 | B |
| Comparative Example 15 | 1.00 | — |
| Comparative Example 16 | 1.15 | A |

TABLE 6

| | Properties of magnetite particles | | |
|---|---|---|---|
| Examples | Kind | | Average particle diameter (μm) |
| Example 34 | Spherical magnetite | | 0.15 |
| Example 35 | Spherical magnetite | | 0.15 |
| Example 36 | Spherical magnetite | | 0.18 |

| | Properties of magnetite particles | | |
|---|---|---|---|
| Examples | BET specific surface area value (m²/g) | FeO content (wt %) | Saturation magnetization value σs (Am²/kg) |
| Example 34 | 10.8 | 25.6 | 82 |
| Example 35 | 10.8 | 25.6 | 82 |
| Example 36 | 9.7 | 26.0 | 83 |

| | Coating treatment with Ti compound | | Na compound added | |
|---|---|---|---|---|
| Examples | Kind of Ti compound | Ti/whole Fe (atm %) | Kind | Amount added (g) |
| Example 34 | TiOSO₄ | 30 | sodium sulfate | 420 |
| Example 35 | TiOSO₄ | 32 | sodium carbonate | 100 |
| Example 36 | TiCl₄ | 20 | sodium sulfate | 840 |

| | Different kinds of metal elements | | Heat-treatment | |
|---|---|---|---|---|
| Examples | Kind | Amount added (atm %) | Temperature (° C.) | Time (min) |
| Example 34 | — | — | 750 | 60 |
| Example 35 | — | — | 750 | 60 |
| Example 36 | — | — | 750 | 60 |

TABLE 7

| | Properties of black iron-based particles | |
|---|---|---|
| Examples | Average particle diameter (μm) | Composition |
| Example 34 | 0.16 | Fe₂O₃—FeTiO₃ + Fe₃O₄-γ-Fe₂O₃ + NaFeTi₃O₈ |
| Example 35 | 0.18 | Fe₂O₃—FeTiO₃ + Fe₂TiO₅ + NaFeTi₃O₈ |
| Example 36 | 0.17 | Fe₂O₃—FeTiO₃ + Fe₃O₄-γ-Fe₂O₃ + NaFeTi₃O₈ |

| | Properties of black iron-based particles | |
|---|---|---|
| Examples | Ratio of peak intensity of (220) plane of Fe₃O₄-γ-Fe₂O₃ solid solution to peak intensity of (104) plane of Fe₂O₃—FeTiO₃ solid solution | Ratio of main peak intensity of NaFeTi₃O₈ to peak intensity of (104) plane of Fe₂O₃—FeTiO₃ solid solution |
| Example 34 | 1:0.12 | 0.08:1 |
| Example 35 | — | 0.04:1 |
| Example 36 | 1:0.52 | 0.32:1 |

| | Properties of black iron-based particles | | |
|---|---|---|---|
| Examples | Ti/whole Fe (atm %) | Different kinds of metal elements (atm %) | BET specific surface area value (m²/g) |
| Example 34 | 29.8 | — | 8.5 |
| Example 35 | 32 | — | 8.0 |
| Example 36 | 20.5 | — | 9.0 |

| | Properties of black iron-based particles | | |
|---|---|---|---|
| Examples | Saturation magnetization value (Am²/kg) | Blackness (L* value) | Tinting strength |
| Example 34 | 12.0 | 9.2 | 40.2 |
| Example 35 | 0.2 | 10.5 | 40.9 |
| Example 36 | 57.0 | 8.5 | 40.5 |

TABLE 8

| Examples | Iron-titanium composite oxide | Blue pigment Kind | Blue pigment Amount added (wt %) | Blue pigment Existing condition of blue pigment | BET specific surface area value (m²/g) | Saturation magnetization value (Am²/kg) | Blackness (L* value) | Tinting strength |
|---|---|---|---|---|---|---|---|---|
| Example 37 | Example 34 | Cuphthalocyanine | 5 | Surface coat | 8.8 | 11.4 | 7.2 | 38.0 |

TABLE 9

| Examples | Black non-magnetic particles used | Properties of toner Saturation magnetization value (Am²/kg) |
|---|---|---|
| Example 38 | Example 34 | 2.3 |
| Example 39 | Example 35 | 0 |
| Example 40 | Example 36 | 10.9 |
| Example 41 | Example 37 | 2.2 |

| Examples | Properties of toner Initial image density | Fogging |
|---|---|---|
| Example 38 | 1.50 | A |
| Example 39 | 1.45 | A |
| Example 40 | 1.60 | B |
| Example 41 | 1.65 | A |

What is claimed is:

1. Black iron-based particles comprising a $FeTiO_3$—$Fe_2O_3$ solid solution or a mixed composition of a $FeTiO_3$—$Fe_2O_3$ solid solution and an iron-based oxide having a spinel structure, and having a Ti content of from more than 10.0 atm % to 40.0 atm %, calculated as Ti, based on whole Fe, and a blackness (L* value) of 6 to 13.

2. Black iron-based particles according to claim 1, wherein said iron-based oxide having a spinel structure is contained in such an amount that a ratio of a peak intensity of (220) plane of $Fe_3O_4$-$\gamma$-$Fe_2O_3$ constituting the iron-based oxide having a spinel structure to a peak intensity of (104) plane of $FeTiO_3$—$Fe_2O_3$ is 1:0.5 or less, when measured by an X-ray diffraction method.

3. Black iron-based particles according to claim 2, wherein said ratio of a peak intensity of (220) plane of $Fe_3O_4$-$\gamma$-$Fe_2O_3$ constituting the iron-based oxide having a spinel structure to a peak intensity of (104) plane of $FeTiO_3$—$Fe_2O_3$ is 1:0.01 to 1:0.45.

4. Black iron-based particles according to claim 1, wherein said black iron-based particles have a saturation magnetization value of not more than 60 Am²/kg and an average particle diameter of 0.01 to 0.50 $\mu$m.

5. Black iron-based particles according to claim 1, wherein said black iron-based particles have a Ti content of 20 to 33.3 atm %, calculated as Ti, based on whole Fe, a saturation magnetization value of 0.1 to 40 Am²/kg, a blackness (L* value) of 6 to 12.5 and an average particle diameter of 0.04 to 0.24 $\mu$m.

6. Black iron-based particles according to claim 1, wherein said black iron-based particles have a BET specific surface area value of 6 to 30 m²/g and a tinting strength of 35 to 45.

7. Black iron-based particles according to claim 1, which further comprise a Na—Fe—Ti compound.

8. Black iron-based particles according to claim 7, wherein said Na—Fe—Ti compound is contained in such an amount that a ratio of a main peak intensity of the Na—Fe—Ti compound to a peak intensity of (104) plane of $FeTiO_3$—$Fe_2O_3$ is 0.01:1 to 1.00:1, when measured by an X-ray diffraction method.

9. Black iron-based particles according to claim 7, wherein said Na—Fe—Ti compound is $NaFeTi_3O_8$, $NaFeTiO_4$ or $Na_{0.75}Fe_{0.75}Ti_{0.25}O_2$.

10. Black iron-based particles according to claim 7, wherein said black iron-based particles have a saturation magnetization value of 0.1 to 60 Am²/kg.

11. Black iron-based particles according to claim 1, which further comprise a blue pigment in an amount of 0.1 to 20% by weight.

12. Black iron-based particles according to claim 11, wherein said black iron-based particles have a blackness (L* value) of 6 to 12 and a tinting strength of 30 to 42.

13. A black non-magnetic toner comprising a binder resin and the black iron-based particles as defined in claim 1.

14. Black iron-based particles a $FeTiO_3$—$Fe_2O_3$ solid solution or a mixed composition of a $FeTiO_3$—$Fe_2O_3$ solid solution and an iron-based oxide having a spinel structure, and having a Ti content of from more than 10.0 atm % to 40.0 atm %, calculated as Ti, based on whole Fe, a blackness (L* value) of 6 to 13, a saturation magnetization value of 5 to 40 Am²/kg and an average particle diameter of 0.04 to 0.24 $\mu$m.

15. Black iron-based particles comprising:

a $FeTiO_3$—$Fe_2O_3$ solid solution or a mixed composition of a $FeTiO_3$—$Fe_2O_3$ solid solution and an iron-based oxide having a spinet structure, and a Na—Fe—Ti compound, and having a Ti content of from more than 10.0 atm % to 40.0 atm %, calculated as Ti, based on whole Fe, a saturation magnetization value of 0.1 to 60 Am²/kg, a blackness (L* value) of 6 to 13 and an average particle diameter of 0.04 to 0.24 $\mu$m, said Na—Fe—Ti compound being contained in such an amount that a ratio of a main peak intensity of the Na—Fe—Ti compound to a peak intensity of (104) plane of $FeTiO_3$—$Fe_2O_3$ is 0.01:1 to 1.00:1, when measured by an X-ray diffraction method.

16. Black iron-based particles comprising:

(1) 80 to 99.9 parts by weight of a $FeTiO_3$—$Fe_2O_3$ solid solution or a mixed composition of a $FeTiO_3$—$Fe_2O_3$ solid solution and an iron-based oxide having a spinel structure; and (2) 0.1 to 20 parts by weight of a blue pigment, and having a Ti content of from more than 10.0 atm % to 40.0 atm %, calculated as Ti, based on whole Fe, a saturation magnetization value of 5 to 40 Am$^2$/kg, a blackness (L* value) of 6 to 13 and an average particle diameter of 0.04 to 0.24 μm.

17. Black iron-based particles according to claim 14, wherein said iron-based oxide having a spinel structure is contained in such an amount that a ratio of a peak intensity of (220) plane of Fe$_3$O$_4$-γ-Fe$_2$O$_3$ constituting the iron-based oxide having a spinel structure to a peak intensity of (104) plane of FeTiO$_3$—Fe$_2$O$_3$ is 1:0.5 or less, when measured by an X-ray diffraction method.

* * * * *